CONTROL OF TRANSMISSION IN TWO-WAY TELEPHOTOGRAPH SYSTEMS

Filed Feb. 17, 1949 5 Sheets-Sheet 1

INVENTOR
T. A. JONES
BY
Stanley B. Kent
ATTORNEY

INVENTOR
T. A. JONES
BY
Stanley B. Kent
ATTORNEY

CONTROL OF TRANSMISSION IN TWO-WAY TELEPHOTOGRAPH SYSTEMS
Filed Feb. 17, 1949 5 Sheets-Sheet 3

INVENTOR
T. A. JONES
BY
Stanley B. Kent
ATTORNEY

March 30, 1954 T. A. JONES 2,673,891

CONTROL OF TRANSMISSION IN TWO-WAY TELEPHOTOGRAPH SYSTEMS

Filed Feb. 17, 1949 5 Sheets-Sheet 4

INVENTOR
T. A. JONES
BY
Stanley B. Kent
ATTORNEY

March 30, 1954 T. A. JONES 2,673,891

CONTROL OF TRANSMISSION IN TWO-WAY TELEPHOTOGRAPH SYSTEMS

Filed Feb. 17, 1949 5 Sheets-Sheet 5

INVENTOR
T. A. JONES
BY Stanley B. Kent
ATTORNEY

Patented Mar. 30, 1954 2,673,891

UNITED STATES PATENT OFFICE 2,673,891

CONTROL OF TRANSMISSION IN TWO-WAY TELEPHOTOGRAPH SYSTEMS

Theodore A. Jones, Tenafly, N. J., assignor to Bell Telephone Laboratories, Incorporated, New York, N. Y., a corporation of New York Application February 17, 1949, Serial No. 76,936

12 Claims. (Cl. 178—6.6)

This invention relates to switching circuits and more particularly to a signal-controlled automatic switching circuit for a pilot regulated telephotograph system.

An object of the invention is to provide an improved signal transmission system of the type including a pilot-controlled level compensator.

An illustrative embodiment of the present invention is an improvement of the telephotograph system disclosed and claimed in an application of W. A. Phelps, Serial No. 21,077, filed April 14, 1948, for Telephotograph Systems Including a Pilot Gain Control Channel, which issued as Patent No. 2,554,153 on May 22, 1951. In the system therein disclosed, pilot currents of the same nominal frequency are transmitted in both directions of a two-way telephotograph system to compensate for level changes in the transmission facilities employed.

In a particular telephotograph system comprising a large number of terminal stations located at geographically widely separated points interconnected by wire transmission facilities, the problem of interference becomes increasingly great. In a system of telephone transmission covering generally the whole United States, broad-band transmission facilities are used for the long haul services. In these broad-band facilities, various measures have been taken to guard against disturbances which adversely affect the quality of transmission of signals thereover. The protective devices employed function satisfactorily with respect to telephone transmission, such as voice and program, the ultimate receiver for which is the human ear. However, when telephotograph signals are being transmitted over these long circuits, it becomes necessary to guard against disturbances which adversely affect the quality of the received picture. Disturbances which cause sudden signal level changes of as little as 0.1 db (decibel) can be detected in the received picture if they occur in an area of flat gray tones. Sudden signal level changes larger than 0.2 db will generally be objectionable. Interference which repeats itself cyclically such, for example, as low frequency alternating current, will cause an objectionable interference pattern in the received picture.

Transmission facilities which are available and being used to some extent in the United States for telephotographic transmission have been described in publications. A comprehensive description of available facilities is given by Mr. E. H. Colpitts in the Bell System Technical Journal for April, 1937, beginning on page 119, under the title "Recent trends in toll transmission in the United States." The facilities have been extended since 1937. In this description three broad-band systems are discussed. One of these systems is for application on telephone toll cables of the kind long in use, such as No. 19 gauge paper insulated toll cables. This system utilizes frequencies up to 60 kc. (kilocycles per second) and is now known as the type K carrier system. A second system is for application on open-wire telephone circuits so as to secure more telephone channels on any given pair. This system utilizes frequencies from 35 kc. to 140 kc. and is now known as the type J carrier system. A third system is for application on coaxial cables which have come into use rather recently. This system provides a very large number of telephone circuits, originally 240 for a million cycle band, and is now known as the type L carrier system.

It is obvious that in these broad-band systems the gain at each repeater station cannot be controlled by any one telephone channel exclusively. The problem of maintaining the signal level constant to the degree necessary for satisfactory telephotograph reception is enormously increased. Some of the disturbances encountered are due to level changes produced by the transmission regulators which are disturbed by ringing currents, switchhook transients and high level talkers in other channels. As noted hereinbefore, these disturbances are not noticeable for the talking and program transmissions but are noticeable in the received pictures of telephotograph transmissions.

In the broad-band systems, signals from groups of telephone circuits are combined for transmission over the cable or wire facilities. At the telephone central offices in which the broad-band facilities terminate the signals corresponding to the several telephone circuits of a group are selected and transmitted over transmission facilities individual to the several circuits. For telephotograph purposes level compensator equipment of the kind disclosed in the hereinbefore mentioned Phelps application is located at such central offices and is associated with and is individual to the telephone loop assigned to telephotograph transmission. A typical broad-band system of the kind just referred to is shown in Fig. 11 of the Colpitts publication which is a schematic representation of a broad-band cable carrier system providing twelve channels in each direction. This is a typical type K system.

Typical telephotograph equipment producing signaling currents suitable for transmission over a telephone circuit of a broad-band system is described by Mr. F. W. Reynolds in the Bell System Technical Journal for October 1936 beginning on page 549 under the title "A new telephotograph system." By means of this system, pictures up to 11 inches by 17 inches may be transmitted by scanning 100 lines per inch with a velocity of 20 inches per second to produce a signal band extending from 1,200 C. P. S. (cycles per second) to 2,600 C. P. S. which includes the carrier of 2,400 C. P. S. and the so-called single sideband. At the receiver this signal band is utilized to produce a picture by means of a photographic emulsion. As noted hereinbefore, if the received level of this signal varies suddenly by as small an amount as 0.2 db or varies in accordance with a low frequency interfering current, objectionable effects in the received picture are produced.

By the use of the Phelps level compensator, considerably larger variations in signal level than 0.2 db at the receiving terminal central offices of the broad-band facilities are compensated so that deleterious changes of tone in the received picture are prevented. In one embodiment of the Phelps invention, a pilot-controlled forward-acting gain control device operating on the picture modulated carrier at the receiving terminal of a broad-band transmission facility is employed. A pilot of constant amplitude and a frequency close to and above the picture-modulated carrier band, for example 3,145 C. P. S. is transmitted over the same channel as the picture modulated carrier. At the receiving telephone central office the pilot is selected by a filter, rectified in a copper-oxide rectifier, passed through a low-pass filter and in cooperation with a biasing potential controls a variable attenuator or variable losser having copper-oxide elements, located in the picture-modulated carrier channel in such manner that the attenuator operates to maintain the ratio of the amplitudes of the received and transmitted picture-modulated carrier substantially constant at all times during the reception of a picture, that is to say, any change in received picture current level which is due to changes in the transmission medium between the sending and receiving central offices is compensated.

While the pilot currents are nominally of the same frequency, they are obtained practically from different generators. Therefore, the pilot currents transmitted from the two terminals of a two-way system ordinarily differ slightly in absolute frequencies and sometimes generate a beat frequency in the broad-band transmission facilities. This beat frequency appears as interference in the receiver of the active channel and produces an interference pattern in the received picture.

This difficulty is overcome by the automatic switching circuit of the present invention. This switching circuit prevents the production of an interference pattern by preventing flow of pilot current in the idle channel. In an illustrative embodiment of the present invention a differential switching circuit is provided at each terminal of a broad-band facilities link. The switching equipment at each terminal is substantially the same. Considering the equipment at one terminal, for example, a differential rectifier is coupled through vacuum tube amplifiers to the transmitting channel and the receiving channel. The amplified unidirectional output current from this rectifier energizes relays which perform several switching functions. When a picture is to be transmitted through this terminal to the distant terminal, unmodulated carrier current is transmitted through the transmitting channel as a preparatory step. This carrier current is predominant over the current in the receiving channel, even if pilot current is present in the receiving channel of this terminal, so that the relays are energized in a manner to cause the transmission of pilot current from this terminal over the transmitting channel of this terminal by removing a short circuit from the pilot oscillator. The bias voltage for the variable losser in the receiving channel of this terminal is set at a fixed value so that in the absence of received pilot current the losser provides a compromise loss to prevent excessive noise being introduced at the losser. In the switching equipment at the distant terminal under these same conditions the received unmodulated carrier current in the receiving channel is predominant so that pilot current is prevented from being trasmitted over the sending channel to the first terminal by reason of a short circuit maintained on the pilot oscillator, and the variable losser in the receiving channel is placed under control of the pilot current from the first terminal which now appears in the receiving channel.

A similar switching operation takes place preparatory to the transmission of a picture in the opposite direction.

An advantage of this invention is that the switching is accomplished without any acts on the part of the subscriber other than those normally exercised in preparing to transmit a picture.

Another important feature of this invention is means to prevent a switch taking place until such time as the idle channel carries a predominant unmodulated carrier current. This feature insures that the active channel will not lose control even though the modulated carrier current is reduced to a small value as when a dark area of appreciable size is being scanned.

Another feature of this invention is the approximately flat frequency-gain characteristic of the switching circuit between 1,000 and 3,200 C. P. S. so that when the picture circuit is used for voice transmission during the intervals between pictures, normal operation of the switching circuit occurs, including pilot gain control on the talking channel.

The invention will now be described more in detail with reference to the accompanying drawings.

Figs. 1, 2, 3 and 4, taken together, illustrate an embodiment of the invention in a two-way telephotograph system.

Figures 1, 5:
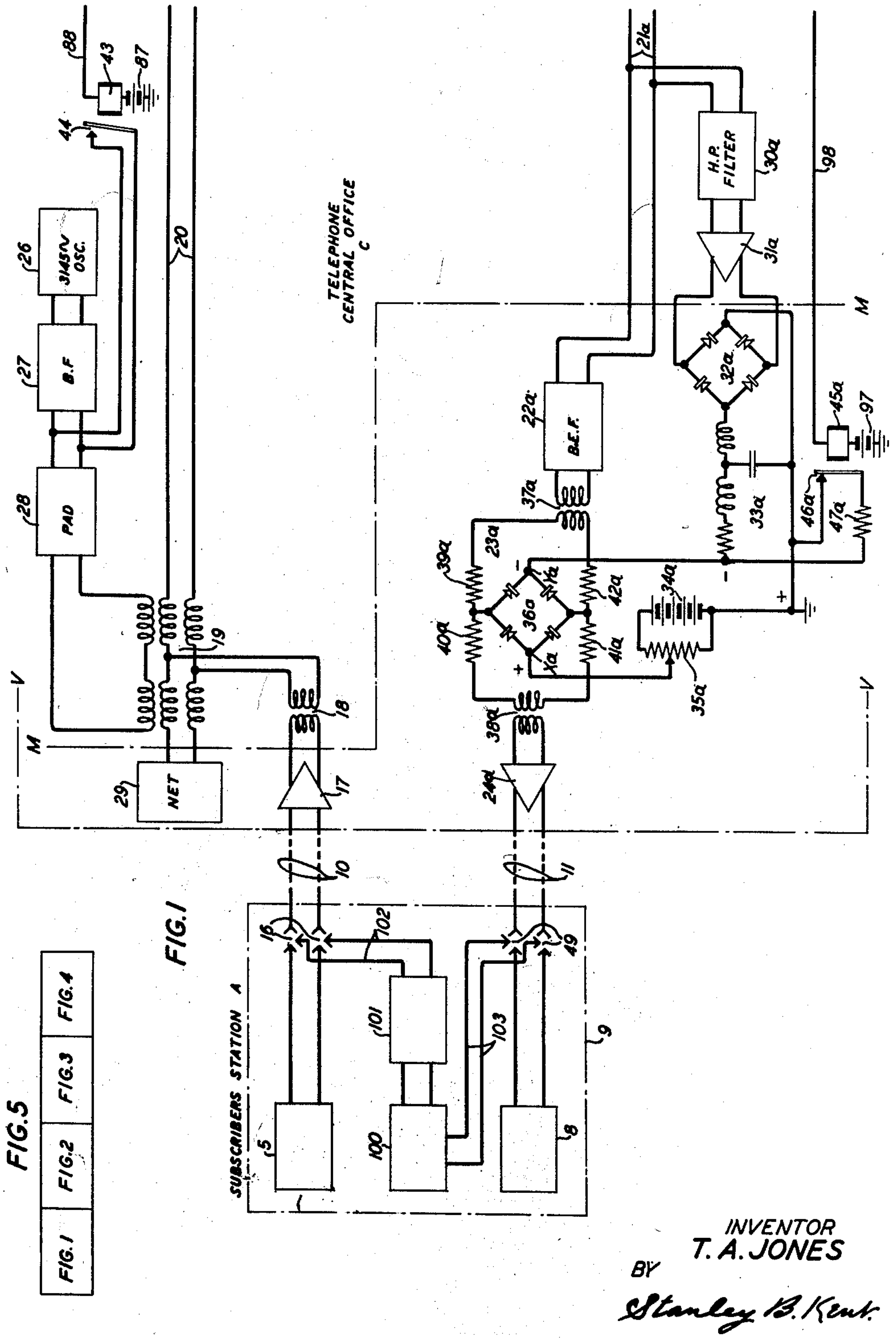
Fig. 5 is an arrangement diagram for Figs. 1 to 4.
Figure 2:
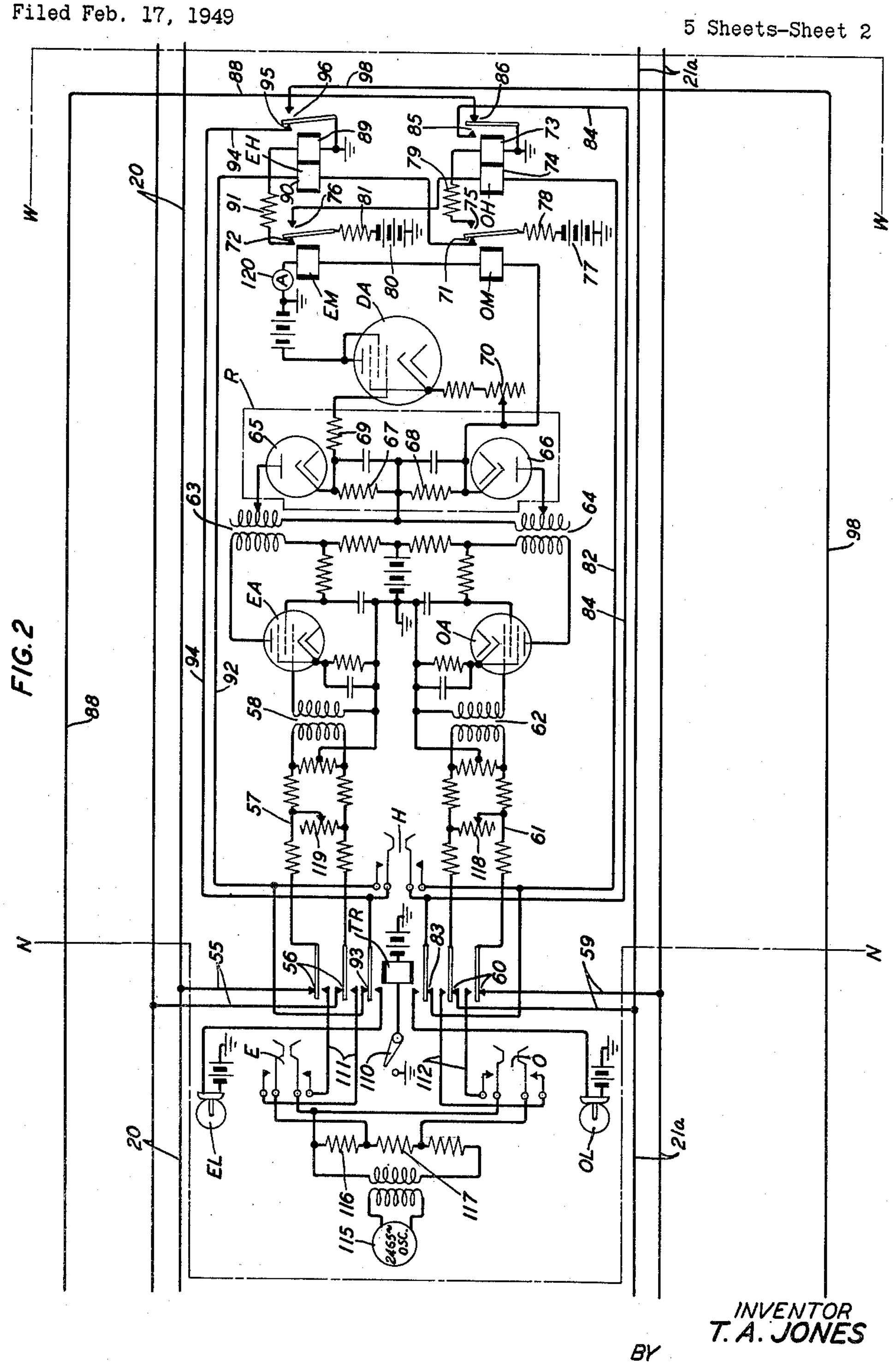
Figure 3:
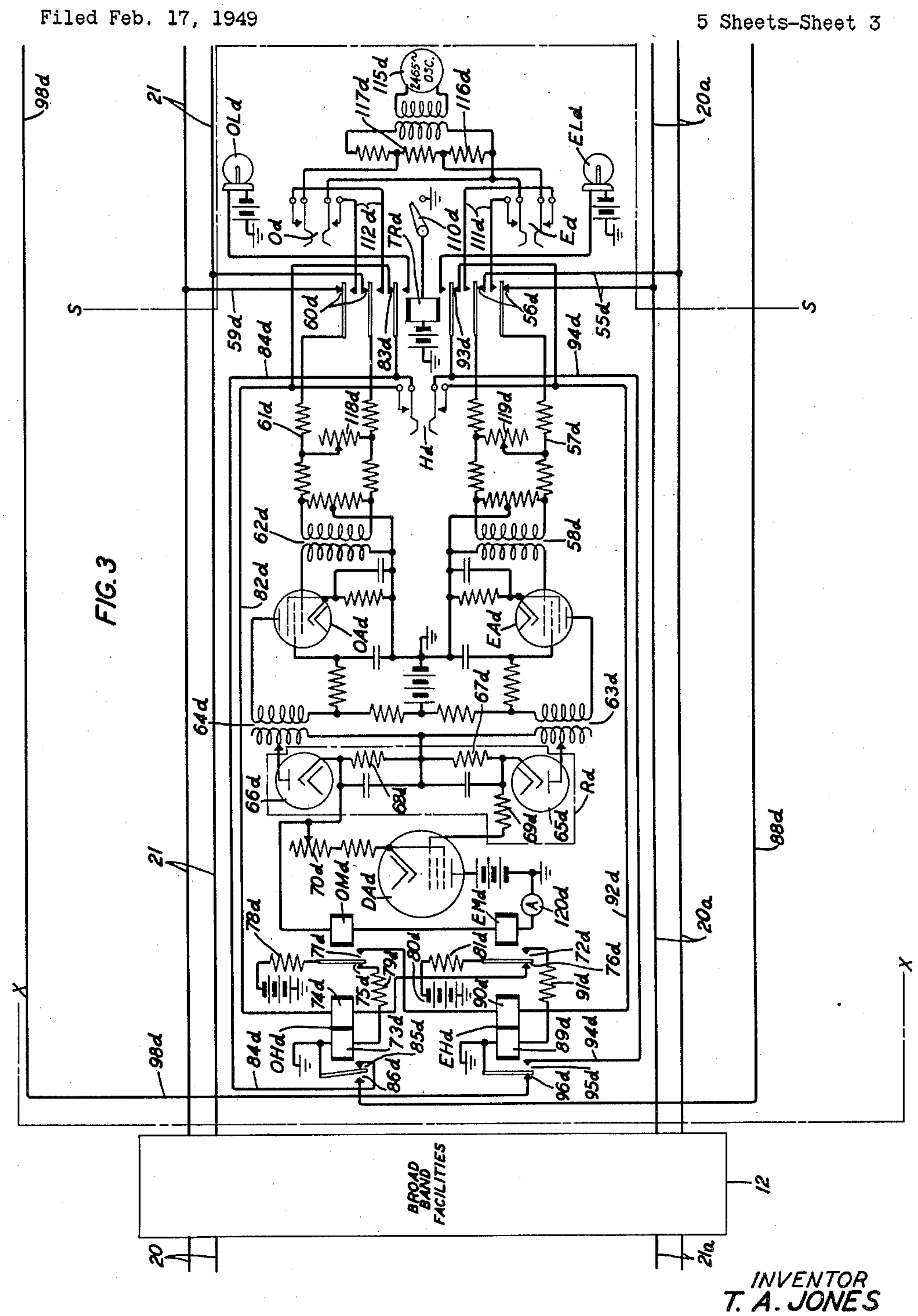
Figure 4:
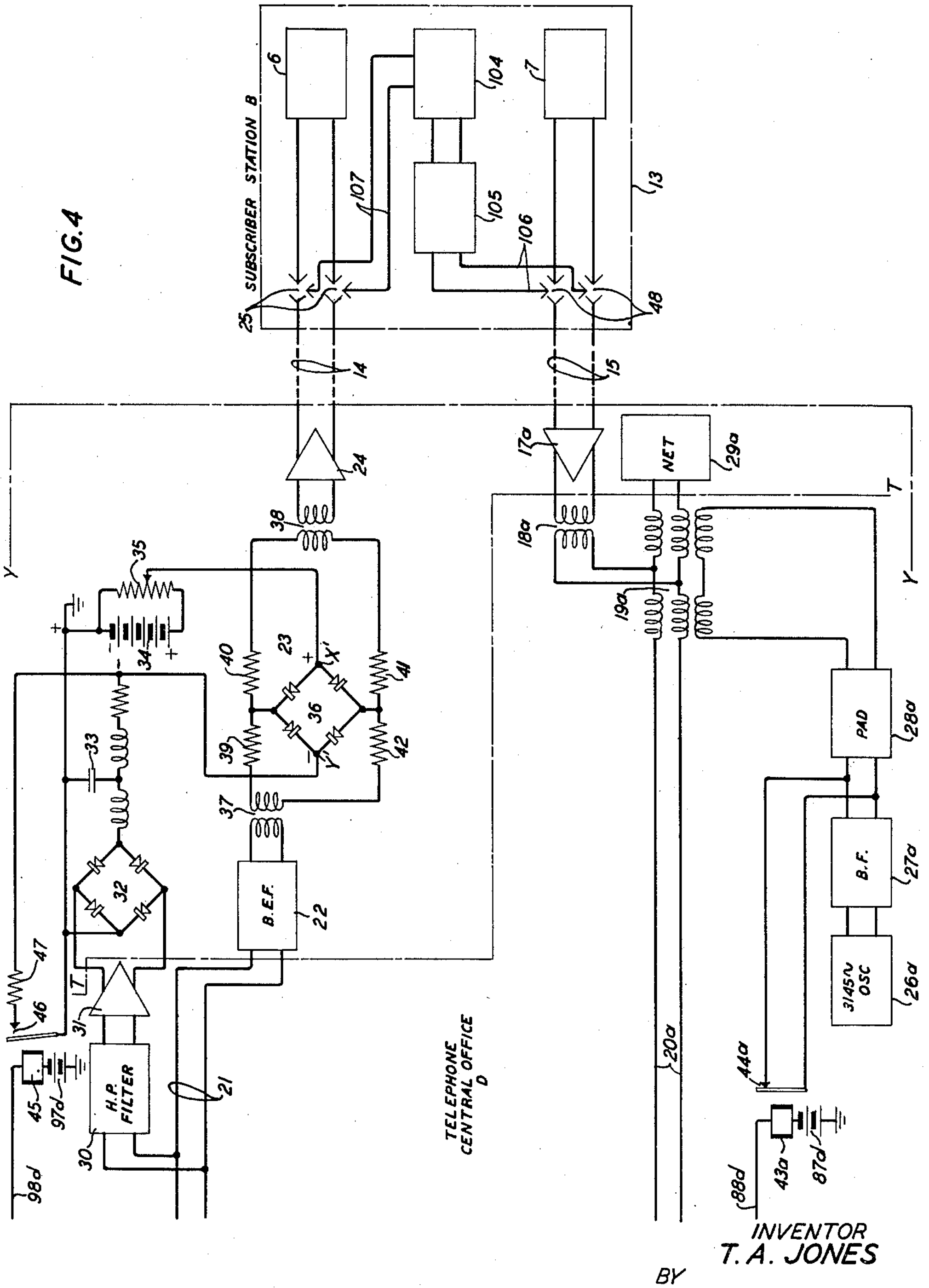

In the system of Figs. 1 to 4, pictures may be transmitted from subscriber's station A to subscriber's station B and vice versa. Speech may also be transmitted in both directions. For the proper functioning of the system the various transmissions should take place at different times. As illustrated, the elements of the system are in the condition shown when transmission is taking place from the telephotograph transmitter 5 at station A to the telephotograph receiver 6 at station B. At such time, the elements in the channel comprising the telephotograph transmitter 7 at station B and the telephotograph receiver 8 at station A are in the idle condition. The equipment at station A shown within the block 9 is connected to the equipment at telephone central office C shown between the dot-dash lines V, V and W, W partly on Fig. 1 and the rest on Fig. 2 by subscriber's loops 10 and 11. Transmission from central office C to telephone central office D, shown between the dot-dash lines X, X and Y, Y on Figs. 3 and 4, is effected over the broad-band facilities indicated by the block 12 on Fig. 3. The equipment at central office D is connected to the equipment at subscriber's station B, shown within the block 13, by subscriber's loops 14 and 15.

The elements used for effecting transmission from station A to station B will now be described further. In the illustrative system being described, the telephotograph transmitter 5 produces a carrier current of 2,400 C. P. S. which, during the scanning of the picture is modulated in accordance with the tone values of the picture. The essential frequencies lie within the band from 1,200 to 2,600 C. P. S. The transmission channel for the frequencies generated by telephotograph transmitter 5 includes connector 16, subscriber's loop 10, amplifier 17, repeating coil 18, hybrid coil 19, conductors 20, broad-band facilities 12, conductors 21, band elimination filter 22, variable losser 23, amplifier 24, subscriber's loop 14, connectors 25, and telephotograph receiver 6. Telephotograph receiver 6 utilizes the transmitted frequencies within the band from 1,200 to 2,600 C. P. S. to reproduce the picture.

In order to compensate for level changes occurring in the broad-band facilities, a pilot frequency is impressed on the transmission channel at central office C to control the variable losser 23 at central office D in the manner described and claimed in the application of W. A. Phelps identified hereinbefore. The pilot frequency at office C is generated by oscillator 26, transmitted through band filter 27 and resistor pad 28, and impressed on conductors 20 through hybrid coil 19 which is balanced by network 29. At central office D the pilot frequency traverses high-pass filter 30, is amplified in amplifier 31 and rectified in rectifier 32. The rectified current after passing low-pass filter 33 is impressed on the terminals X' and Y' of variable losser 23. The losser 23 is adjustably biased by a suitable direct-current source such as battery 34 and potentiometer 35.

The variable losser 23 comprises a cuprous oxide rectifier bridge 36 connected across the resistive circuit including input transformer 37, output transformer 38, series resistors 39 and 40 and series resistors 41 and 42. When the direct-current terminal X' is positive with respect to terminal Y', the impedances of the rectifier elements are reduced and the loss in the losser 23 is larger than it would be otherwise. Therefore, if the pilot current increases for any reason, the loss in the losser increases and the signal current in the output of the losser decreases. When the circuit is properly adjusted, changes in the transmission characteristics of the broad-band facilities which affect both the signal currents and the pilot frequency current, are compensated in the losser 23 so that output current from the losser is substantially the same as though the changes had not occurred.

The application of the pilot frequency is controlled by relay 43 according to this invention. When relay 43 is deenergized the output circuit of oscillator 26 is short-circuited at the back contacts 44 of relay 43. At central office D relay 45 when deenergized is adapted to connect at its back contacts 46 a fixed resistor 47 across the output terminals of low-pass filter 33 in order to bias the losser 23 to a compromise value when pilot current is not being received. The purpose of this arrangement will be described hereinafter.

The other channel over which transmission is effected from the telephotograph transmitter 7 at subscriber's station B to the telephotograph receiver 8 at subscriber's station A contains similar circuit elements which, unless otherwise designated, are designated respectively by the same reference numerals followed by the letter *"a."* The telephotograph transmitter 7 at station B is adapted to be connected to subscriber's loop 15 by connectors 48. The telephotograph receiver 8 at subscriber's station A is adapted to be connected to subscriber's loop 11 by connectors 49. As illustrated, the channel for transmission from transmitter 7 to receiver 8 is the idle channel. Transmitter 7 is not connected to subscriber's loop 15 and receiver 8 is not connected to subscriber's loop 11. Pilot frequency is prevented from being impressed on conductors 20*a* from oscillator 26*a* by the short circuit at the back contacts 44*a* of relay 43*a*. In view of the absence of pilot frequency on this idle channel, the bias on losser 23*a* is set at a compromise value by the connection of resistor 47*a* across the output terminals of low-pass filter 33*a* by the back contacts 46*a* of relay 45*a*.

It has been found that the presence of the pilot frequency on both the active and the idle channels may cause an interference pattern in the received picture. Such interference occurs if there is sufficient cross-talk between the two channels, which are carrying pilot currents of nominally the same frequency but actually of slightly different frequency because such currents are obtained from different oscillators. This beat frequency interference is prevented by removal of the pilot frequency from the idle channel. When the pilot is removed from the idle channel under normal adjustment, the loss in the losser is greatly reduced so that the noise output from the losser may adversely affect the transmission in the active channel due to cross-talk between the subscriber's sending and receiving loops; also this noise is objectionable to a talker when the channels are used for voice transmission. In order to obviate this difficulty, the bias of the losser in the idle channel is set automatically at a compromise value to prevent troublesome noise output.

According to features of this invention, means are provided at the central offices at the terminals of the broad-band facilities for automatically impressing the pilot on the active channel, removing the pilot from the idle channel, placing the variable losser of the active channel under control of the pilot on that channel and setting the bias of the losser of the idle channel to a compromise value to obviate noise interference, the active channel being the channel over which picture current was last transmitted having a level higher than that of the pilot current in the other channel.

Illustrative means for accomplishing these results comprising automatic switching circuits will now be described by reference principally to Figs. 2 and 3. As hereinbefore mentioned, the circuit of Figs. 1 to 4 is shown in the condition for transmission from subscriber's station A to subscriber's station B, over the channel comprising subscriber's loop 10, conductors 20 and 21 and subscriber's loop 14. Picture carrier current of 2,400 C. P. S. is impressed on conductors 20 when the subscriber at station A is prepared to transmit a picture. This carrier current is at a higher level than any current in conductors 21a of the other channel. The switching circuit of Fig. 2 is controlled by this predominant picture carrier current. Referring now particularly to Fig. 2, the automatic switching circuit at central office C includes two amplifiers EA and OA having their high impedance input connections bridged across the transmitting and receiving circuits 20 and 21a, respectively. The input circuit for amplifier EA comprises conductors 55, back contacts 56 of test relay TR, resistor pad 57 and transformer 58. The input circuit for amplifier OA comprises conductors 59, back contacts 60 of test relay TR, resistor pad 61 and transformer 62. Amplifiers EA and OA are coupled to a differential rectifier R by transformers 63 and 64, respectively. The rectifier R comprises preferably a double diode which, for convenience, is shown as two diodes 65 and 66, coupling resistors 67 and 68 and a series resistor 69. The output circuit of rectifier R is coupled to the input circuit of a direct-current amplifier tube DA with the cathode of diode 65 connected through resistor 69 to the grid of tube DA and the cathode of diode 66 connected to the cathode of tube DA through an adjustable cathode resistor 70. The output circuit of amplifier tube DA includes the energizing windings of relays EM and OM and the cathode resistor 70 in series. The energization of diode 65 tends to make the grid of tube DA more positive and the energization of diode 66 tends to make this grid more negative. The adjustment of cathode resistor 70 is such that with no output current or equal output currents from amplifiers EA and OA the constant grid bias on tube DA causes a normal direct-current output current in the windings of relays EM and OM which is sufficient to operate relay OM, closing its front contacts 71, but not sufficient to operate relay EM. When unmodulated picture carrier current flows in conductors 20, amplifier EA is energized and its rectified output current will cause the grid of amplifier DA to become more positive, causing its output current to increase sufficiently to operate relay EM, closing its front contacts 72 while holding the front contacts 71 of relay OM closed.

The contacts of relays EM and OM control the energization of relays EH and OH, the contacts of which in turn perform the desired control functions. Preparatory to sending a picture from subscriber's station A to subscriber's station B, the subscriber at station A transmits unmodulated picture carrier current which appears in conductors 20 of central office C. The distant subscriber at station B insures that the picture transmitter at station B is disconnected from the transmitting channel so that picture carrier current is prevented from appearing in conductors 21a at central office C. Under these conditions relays EM and OM at office C are both energized to close their front contacts 72 and 71, respectively, as shown in Fig. 2.

Relay OH releases since the energizing circuits for both windings 73 and 74 are open at the back contacts 75 and 76 of relays OM and EM, respectively. The energizing circuit for winding 73 extends from grounded battery 77, through resistor 78, back contacts 75 of relay OM, resistor 79, winding 73 of relay OH to ground. The energizing circuit for winding 74 extends from grounded battery 80 through resistor 81, back contacts 76 of relay EM, winding 74 of relay OH, conductor 82, back contact 83 of test relay TR, conductor 84, front contacts 85 of relay OH to ground. Under the conditions just described, the energizing circuit for winding 74 of relay OH is also open at the front contacts 85 of relay OH. The closure of the back contacts 86 of relay OH effects the operation of relay 43, removing the short circuit from oscillator 26 at the back contacts 44 of relay 43 and allowing pilot current to traverse the active channel by way of conductors 20. The energizing circuit for relay 43 extends from grounded battery 87, through the winding of relay 43, conductor 88 and back contacts 86 of relay OH to ground. The pilot current will continue to flow until such time as relay OM is released which will not occur until the level of the current in receiving conductors 21a exceeds the level in the sending conductors 20. Thus, during the scanning of dark portions of a picture when the level of the modulated picture carrier current is low, the pilot current is not interrupted. Even if relay EM releases during such periods to connect battery 80 to winding 74 of relay OH through back contacts 76 of relay EM, the energizing circuit through winding 74 remains open at the front contacts 85 of relay OH. This is an important feature of this invention.

Relay EH is operated by the energization of its winding 89 and locked up by the energization of its winding 90. The energizing circuit for winding 89 extends from grounded battery 80 through resistor 81, front contacts 72 of relay EM, resistor 91 and winding 89 to ground. The energizing circuit for winding 90 extends from grounded battery 77 through resistor 78, front contacts 71 of relay OM, winding 90, conductor 92, back contacts 93 of test relay TR, conductor 94 and front contacts 95 of relay EH to ground. The operation of relay EH releases relay 45a by opening the energizing circuit at the back contacts 96 of relay EH. The energizing circuit for relay 45a extends from grounded battery 97 through the winding of relay 45a, conductor 98 and back contacts 96 of relay EH to ground. The release of relay 45a by the closure of its back contacts 46a connects into the control circuit of the losser 23a a resistor 47a having a value such that the transmission loss of the losser in the absence of pilot current is held near its normal value when controlled by pilot current. Relay 45a will remain released until both relays EM and OM are released which will not occur until the level of the current in the receiving conductors 21a exceeds the level in the sending conductors 20. The release of relay EM only with opening of its front contacts 72 will not cause the release of relay EH because the energizing circuit of locking winding 90 is closed at the front contacts 71 of relay OM and the locking front contacts 95 of relay EH. The release of relay OM also is necessary in order to deenergize winding 90 of relay EH through the opening of front contacts 71 of relay OM. The losser 23a remains in condition to minimize noise until the channel therethrough becomes the active channel. This is also an important feature of this invention.

Referring now to Fig. 3, the automatic switching circuit at central office D is substantially the same as that at central office C, shown on Fig. 2. Therefore, corresponding circuit elements of Fig. 3 are designated by the same reference characters as appear on Fig. 2 followed by the letter "d." The nature of the switching circuit of Fig. 3 will be clear from the description of the corresponding circuit of Fig. 2.

Since the switching circuit of Fig. 3 is shown in the condition when receiving picture-modulated carrier current the current in conductors 21 is predominant. Therefore, the output current of amplifier OA*d* is larger than that in the output of amplifier EA*d* so that the output of rectifier R*d* tends to make the grid of direct-current amplifier DA*d* more negative. Under these conditions both relays OM*d* and EM*d* are released.

Relay OH*d* is energized by current through its winding 73*d* by the closure of its energizing circuit at the back contacts 75*d* of relay OM*d*. Relay OH*d* then locks up due to the energization of its winding 74*d* by current from grounded battery 80*d* through resistor 81*d*, back contacts 76*d* of relay EM*d*, winding 74*d*, conductor 82*d*, back contacts 83*d* of test relay TR*d*, conductor 84*d* and front contacts 85*d* of relay OH*d* to ground. The operation of relay OH*d* opens the energizing circuit of relay 43*a* at the back contacts 86*d* of relay OH*d* placing a short circuit on oscillator 26*a* to prevent the transmission of pilot current from central office D to central office C over conductors 20*a* and 21*a*. This is another important feature of this invention.

Relay EH*d* is released since the energizing circuits for both windings 89*d* and 90*d* are open at the front contacts 72*d* and 71*d* of relays EM*d* and OM*d*, respectively. Under these conditions the energizing circuit for winding 90*d* is also open at the front contacts 95*d* of relay EH*d*. The closure of back contacts 96*d* of relay EH*d* causes the operation of relay 45 to open the circuit of shunting resistor 47 at the back contacts 46 of relay 45, placing the variable losser 23 under the control of the pilot frequency being transmitted from the central office C. This is yet another important feature of this invention.

In the event that the subscriber at station B desires to transmit a picture to station A, the telephotograph transmitter 7 is connected to the subscriber's loop 15 and unmodulated picture carrier current is transmitted. The subscriber at station A connects the telephotograph receiver 8 to the subscriber's loop 11 and makes sure that his telephotograph transmitter 5 is not transmitting picture carrier current to the subsciber's loop 10. The necessary switching operations at central offices C and D then take place automatically. Since the picture carrier current in conductors 20*a* at central office D is at a higher level than the current in conductors 21, which conductors might be carrying pilot current from central office C, relays EM*d* and OM*d* will both be operated (contrary to their position shown on Fig. 3), thereby impressing pilot current on the channel comprising conductors 20*a* and 21*a* and inserting resistor 47 in the control circuit of variable losser 23 in the now idle channel comprising conductors 21. At central office C the current level in conductors 21*a* is higher than that in conductors 20 and relays EM and OM are both deenergized (contrary to their positions shown in Fig. 2). This causes the deenergization of relay EH to place the variable losser 23A in the now active channel under the control of the pilot frequency on that channel and causes the operation of relay OH which deenergizes relay 43, placing a short circuit on oscillator 26 and preventing the transmission of pilot current on the now idle channel. These switching operations take place without any special steps being taken by either of the subscribers. It makes unnecessary the extension of a special control circuit to the subscriber which would require his attention in operating such a circuit. The only action required on the part of the subscribers is the normal manipulation of their telephotographic transmitting and receiving equipments preparatory to the transmission of a picture. This is an important advantage of this invention.

In order to provide for telephone communication between subscribers at stations A and B when the transmission channels are not being used for the transmission of pictures, telephone equipment is provided. Station A is equipped with a two-way telephone set 100 having a transmitting circuit which is adapted to be connected through low-pass filter 101 and conductors 102 to subscriber's loop 10 by connectors 16 and a receiving circuit which is adapted to be connected through conductors 103 to subscriber's loop 11 by connectors 49. Similarly, station B is equipped with a two-way telephone set 104 having a transmitting circuit which is adapted to be connected through low-pass filter 105 and conductors 106 to subscriber's loop 15 by connectors 48 and a receiving circuit which is adapted to be connected through conductors 107 to subscriber's loop 14 by connectors 25. The frequency-gain characteristic of the alternating-current amplifiers of the switching circuits at central offices C and D has been made approximately flat between 1,000 and 3,200 C. P. S. so that when the telephotograph channels are used for voice transmission, normal operation of the switching circuits is obtained. The voice currents control the switching circuits in the same manner as does the unmodulated picture carrier current. Switches occur only when the direction of speech transmission changes, not when transmission merely ceases.

Each of the automatic switching circuits at central offices C and D is provided with means for testing the operation of these circuits. The testing equipment at central office C shown on Fig. 2 will be described in detail. To initiate a test, an energizing circuit for test relay TR is closed at switch 110 thereby closing all of the front contacts of relay TR and transferring the input connections for amplifiers EA and OA from conductors 20 and 21*a*, respectively, of the picture channels to conductors 111 and 112 which are adapted to be connected by keys E and O to oscillator 115 which furnishes testing current at a frequency of 2,465 C. P. S. The levels of the testing current at keys E and O are 15 db below the normal levels of unmodulated picture carrier current at conductors 55 and 59, respectively. In order to obtain these levels key E is connected across resistor 116 and key O is connected across both resistors 116 and 117. Key H, having locking and non-locking positions, provides means for completing during testing the locking circuit of relay EH by way of conductors 92 and 94 and the locking circuit of relay OH by way of conductors 82 and 84 which circuits are normally completed at contacts 93 and 83 when the test relay TR is deenergized. To adjust the gain in the switching circuit after the test relay TR has been energized, key H is left in the nonlocking position. The front contacts 85 and 95 of relays OH and EH are disconnected from windings 74 and 90 of these relays and connected to lamps OL and EL, respectively, so that operation of one of these relays will be indicated by the lighting of the corresponding lamp and will not lock in its operated position. To adjust the gain through the side of the switching circuit including the amplifier OA, key O is held operated and the resistance of adjustable resistor 118 is increased until the lamp OL just lights. Under this condition if the relay OM is properly adjusted the milliammeter 120 should indicate a current between 0.9 and 1.5 ma. (milliamperes). To adjust the gain through the side of the switching circuit including the amplifier EA, key E is held operated and the resistance of adjustable resistor 119 is increased until the lamp EL just lights. Under this condition, if relay EM is properly adjusted the milliammeter 120 should indicate a current between 3.9 and 5.4 ma. The normal reading of milliammeter 120 with neither of keys O and E closed should be the average of the above operating currents of the relays OM and EM and may be adjusted to this value by means of the adjustable resistor 70.

After the gains of the switching circuit have been adjusted the locking function of relays OH and EH may be tested. Without deenergizing relay TR key H is operated to the locking position, thereby connecting the windings 74 and 90 of relays OH and EH to the front contacts 85 and 95 of these relays, respectively, in addition to the indicating lamps OL and EL. Momentary operation of key O or key E should then cause the corresponding lamp OL or EL to light steadily and the other lamp to be extinguished.

The circuit elements provided at central office D for testing the automatic switching circuits corresponding to those at central office C are indicated by the same reference characters followed by the letter "*d*." The operation of this testing apparatus will be obvious from the description of that at central office C and need not be described further at this point.

The milliammeters 120 and 120*d* shown on Figs. 2 and 3, respectively, are inserted in these circuits only for testing purposes. Any suitable type of connectors (none shown) may be used such as plugs and jacks, for example. Relays EM, OM, EH and OH and the corresponding relays at central office D should be quick-acting both on operation and release for best results, in view of the fact that the channels are also used for two-way talking.

Figure 6:
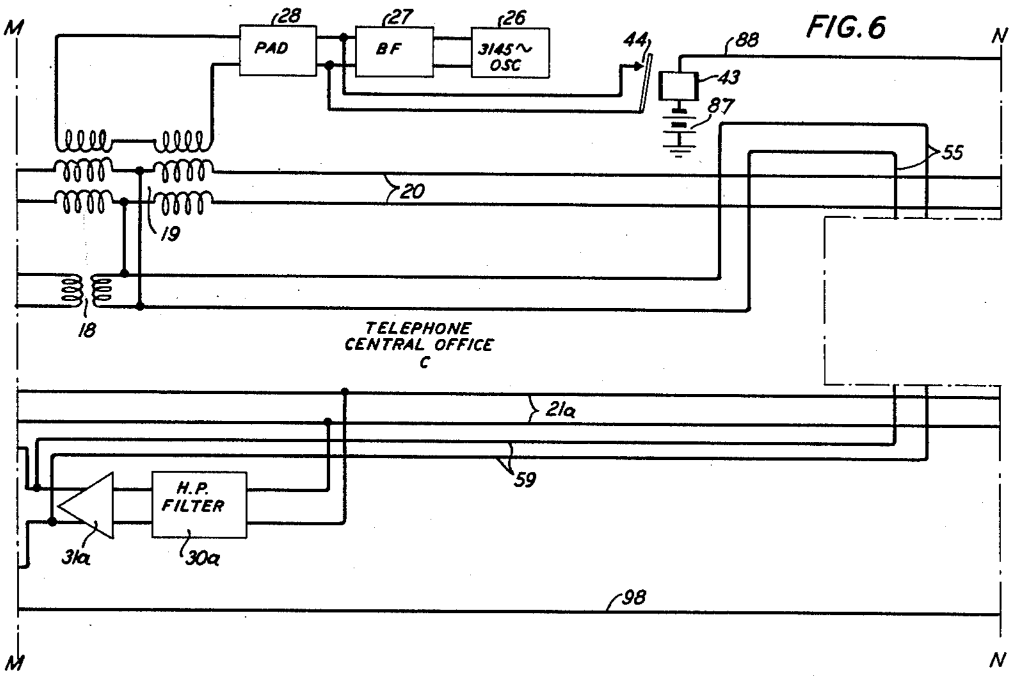
Fig. 6 illustrates a modified form of some of the equipment at telephone central office C.
Figure 7:
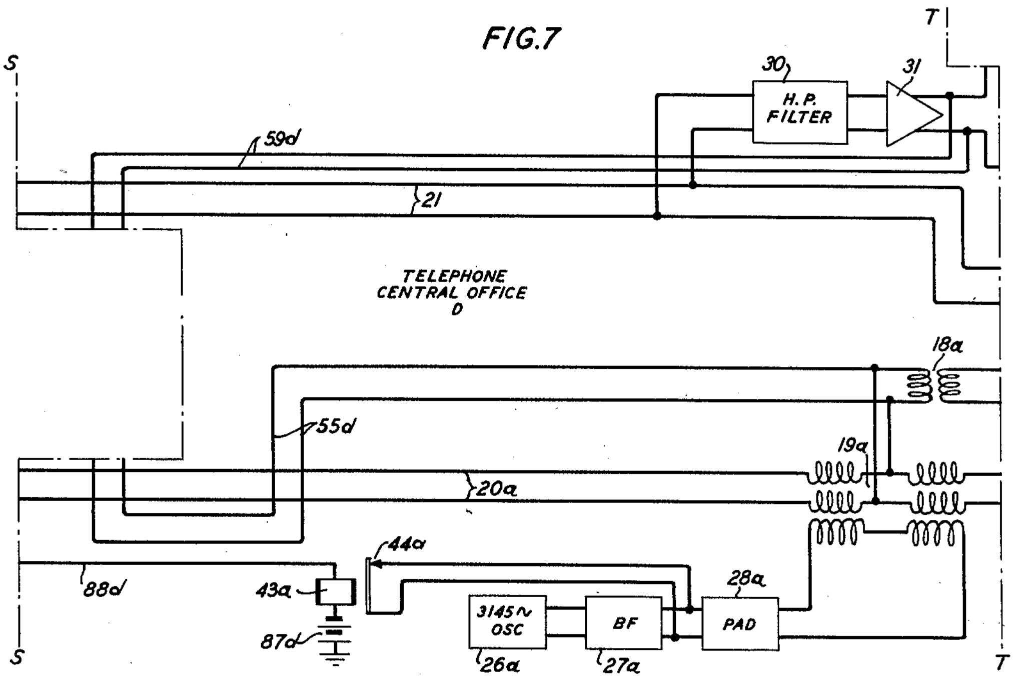
Fig. 7 illustrates a modified form of some of the equipment at telephone central office D.

A modified form of automatic switching circuit is illustrated by Figs. 6 and 7. The equipment of Fig. 6 is substituted for the equipment between dot-dash lines M, M and N, N of telephone central office C of Figs. 1 and 2. The equipment of Fig. 7 is substituted for the equipment between dot-dash lines S, S and T, T of telephone central office D of Figs. 3 and 4. The same reference characters are used for identical elements in all of these figures.

In the modified circuit of telephone central office C the input conductors 55 for amplifier EA are connected to the output winding of repeating coil 18 across the signal input terminals of hybrid coil 19 instead of across the output conductors 20 from this hybrid coil and the input conductors 59 for amplifier OA are connected to the output conductors of receiving pilot current amplifier 31*a* instead of directly across receiving conductors 21*a*. In the modified circuit of telephone central office D the input conductors 55*d* for amplifier EA*d* are connected to the output winding of repeating coil 18*a* across the signal input terminals of hybrid coil 19*a* instead of across the output conductors 20*a* from this hybrid coil and the input conductors 59*d* for amplifier OA*d* are connected to the output conductors of receiving pilot current amplifier 31 instead of directly across receiving conductors 21.

In the modified form of circuit amplifiers EA and EA*d* are controlled in effect only by picture carrier current or by voice currents substantially independently of any transmitted pilot current. This is due to the fact that the signal input terminals of hybrid coils 19 and 19*a* are in conjugate relationship to the corresponding pilot current input terminals. Also in the modified form of circuit amplifiers OA and OA*d* are controlled only by amplified incoming pilot current independently of any incoming picture carrier current or voice currents. This is due to the fact that only pilot current is passed by filters 30*a* and 30. This modified form of circuit is particularly advantageous for speech when the system is used with transmission facilities wherein the pilot current is delayed appreciably with respect to the voice currents. In the modified form of circuit a switch from the transmitting condition to the receiving condition cannot occur until received pilot current is available to control the variable losser the instant that the switch occurs.

In the modified form of circuit the gain of amplifiers EA, OA, EA*d* and OA*d* would be adjusted to take account of the changed control voltages impressed on input conductors 55, 59, 55*d* and 59*d*, respectively.

It is to be understood that the above-described arrangements are illustrative of the applications of the principles of the invention. Numerous other arrangements may be devised by those skilled in the art without departing from the spirit and scope of the invention.

What is claimed is:

1. In a signaling system, a two-way two-channel signal transmission circuit extending between the terminals thereof, each channel having signal transmitting means at one terminal and signal receiving means at the other terminal, a source of control current at each terminal, means at each terminal controlled by the signals supplied by the signal transmitting means thereat to the channel, to impress control current from the control current source thereat on the corresponding channel, means at each terminal responsive to the control current received from the other terminal to control the amplitude of the received signals, and means at each terminal controlled by the transmitted signals over one channel to render ineffective the amplitude controlling means of the other channel without preventing the transmission of signals over said other channel.

2. In a signaling system, a two-way two-channel signal transmission circuit extending between the terminals thereof, each channel having signal transmitting means at one terminal and signal receiving means at the other terminal, a source of control current at each terminal, means at each terminal controlled by the signals supplied by the signal transmitting means thereat to its channel, to impress control current from the control current source at that terminal on the corresponding channel, means at each terminal responsive to the control current received from the other terminal to control the amplitude of the received signals, and means at each terminal to substitute a fixed control voltage to determine the amplitude of received signals in one channel in place of the control current received from the other terminal, when the level of the signals transmitted over the other of said channels exceeds that of the received signals.

3. In a signaling system, a two-way two-channel signal transmission circuit extending between the terminals of the system, each channel having signal transmitting means at one terminal and signal receiving means at the other terminal, a source of control current at each terminal, means at each terminal controlled by the signals supplied by the signal transmitting means thereat to its channel, to impress control current from the control current source at that terminal on the corresponding channel, means at each terminal adapted under control of the control current received from the other terminal to control the amplitude of the received signals, and means at each terminal responsive to the signal current received over one channel from the other terminal, when its level exceeds that of the signal current transmitted out over the other channel from the first terminal, to disable the control current impressing means at said first terminal without preventing transmission of outgoing signals over said other channel.

4. In a telephotograph system, a first subscriber station having a picture sending equipment and a picture receiving equipment, a second subscriber station having a picture sending equipment and a picture receiving equipment, broad-band facilities having two channels adapted to transmit in opposite directions picture currents produced by said picture sending equipments, switching equipment at each terminal of said broad-band facilities for connecting the picture sending equipments of said subscriber stations to the transmitting terminals of said channels of said broad-band facilities and the picture receiving equipments to the receiving terminals of said channels of said broad-band facilities, a source of pilot current included in each said switching equipment, of a frequency outside the band of frequencies produced by said picture sending equipments, a picture current level controlling device included in each said switching equipment, inserted in the receiving terminal of each of said channels which are adapted to transmit picture currents, each said device being controlled by pilot current from the said source at the other terminal, and means included in said switching equipment, under the control of the picture current produced by said picture sending equipment at each terminal, to impress pilot current on the transmitting channel of said broad-band facilities to control said picture level controlling device of the other terminal.

5. In a telephotograph system, a picture sender and a picture receiver, a transmitting channel connecting said picture sender to said picture receiver, a source of pilot current for said transmitting channel, of a frequency outside the band of frequencies transmitted by said picture sender, means controlled by picture current from said picture sender for impressing on said transmitting channel pilot current from said source of pilot current, and a picture current level changer controlled by pilot current in said transmitting channel from said source of pilot current, inserted in said transmitting channel intermediate the connection of said source of pilot current to said transmitting channel and said picture receiver.

6. In a telephotograph system, a picture sender and a picture receiver, a transmitting channel connecting said picture sender to said picture receiver, a source of pilot current for said transmitting channel, of a frequency outside the band of frequencies transmitted by said picture sender, means controlled by picture current from said picture sender for impressing on said transmitting channel pilot current from said source of pilot current, a picture current level changer controllable by pilot current from said source of pilot current, inserted in said transmitting channel intermediate the connection of said source of pilot current to said transmitting channel and said picture receiver, and means controlled by picture current from said picture sender in said transmitting channel for placing said level changer under the control of pilot current impressed on said channel by said source of pilot current.

7. The telephotograph system of claim 6, in which said source of pilot current is normally short-circuited and said means for impressing pilot current on said transmitting channel comprises means for rectifying one energy portion of the picture current from said picture sender and a chain of relays responsive to the rectified current to remove the short-circuit from said source.

8. In a telephotograph system, a first picture sender and a first picture receiver at a first subscriber's station, a second picture sender and a second picture receiver at a second subscriber's station, a first transmitting channel connecting said first picture sender to said second picture receiver for transmitting picture currents from said first subscriber's station to said second subscriber's station, a second transmitting channel connecting said second picture sender to said first picture receiver for transmitting picture currents from said second subscriber's station to said first subscriber's station, a first and a second source of pilot current at said first and said second station, respectively, of a frequency outside the band of frequencies transmitted by said first and said second picture sender, adapted for connection to said first and said second transmitting channel, respectively, a first picture current level changer controllable by pilot current from said first source, inserted in said first channel intermediate the point of connection of said first source thereto and said second picture receiver, a second picture current level changer controllable by pilot current from said second source, inserted in said second channel intermediate the point of connection of said second source thereto and said first picture receiver, a first differential rectifier having one alternating-current input circuit connected to said first channel beyond the point of connection of the first source of pilot current thereto and another alternating-current input circuit connected to said second channel in front of said second level changer, means controlled by the direct current from said first rectifier when the current in said first channel is appreciably greater than the current in said second channel for causing pilot current from said first source to be impressed on said first channel and for biasing said second level changer in the absence of supply of controlling pilot current thereto, so that it produces a fixed average loss in said second transmitting channel, a second differential rectifier having one alternating-current input circuit connected to said second channel beyond the point of connection of said second source of pilot current thereto and another alternating-current input circuit connected to said first channel in front of said first level changer, and means controlled by the direct current from said second rectifier when the current in said first channel is appreciably greater than the current in said second channel for preventing pilot current from said second source from being impressed on said second channel and placing said first level changer under control of said pilot current in said first channel.

9. In a telephotograph system, a picture sender and a picture receiver, a transmitting channel connecting said picture sender to said picture receiver, a source of pilot current for said transmitting channel of a frequency outside the band of frequencies transmitted by said picture sender, means controlled by picture current from said picture sender for impressing on said transmitting channel pilot current from said source of pilot current, a picture current level changer controllable by pilot current from said source of pilot current, inserted in said transmitting channel intermediate the connection of said source of pilot current to said transmitting channel and said picture receiver, and means controlled only by pilot current impressed on said channel by said source of pilot current for placing said level changer under the control of said pilot current.

10. A switching circuit comprising a first relay and a second relay each having an operating winding and switching contacts including front contacts, means for supplying energizing current to the operating windings of said first and second relays in series to cause operation of these relays, a third relay having an operating and a locking winding and front and back switching contacts, means responsive to operation of said first relay to supply energizing current through the front contacts of said first relay to the operating winding of said third relay to operate that relay, and responsive to operation of said second relay to supply energizing current through the front contacts of said second relay to said locking winding of said third relay to lock that relay in operation and a controlled circuit operatively responsive to the operation of said third relay.

11. A switching circuit comprising a first and a second relay each having an operating winding and switching contacts including back contacts, a third relay having an operating and a locking winding and switching contacts including front contacts, means for normally supplying energizing current to the operating and locking winding of said third relay through the back contacts of said second and said first relay, respectively, when said first and second relay are unoperated, to operate and lock into operation said third relay with its front contacts closed, means for supplying energizing current to the operating windings of said first and second relays to operate these relays so as to open their back contacts thereby deenergizing the operating and locking winding of said third relay and causing that relay to release to open its front contacts and close its back contacts, a controlled circuit and means responsive to the closing of the back contacts of the released third relay to cause operation of said controlled circuit.

12. A switching circuit comprising a first and a second relay each having an operating winding and front and back contacts, a third and a fourth relay each having an operating and a locking winding and front and back contacts, energizing circuits for the operating and locking winding of said third relay, including the front contacts of said first relay and the front contacts of said second relay, respectively, energizing circuits for the operating and locking windings of said fourth relay, including the back contacts of said second relay and the back contacts of said first relay, respectively, the front contacts of said first and second relays being normally open with these relays unoperated rendering said third relay normally unoperated due to the resultant open conditions of the energizing circuits for its operating and locking windings, the back contacts of said first and second relays being normally closed with these relays unoperated rendering said fourth relay normally operated due to the resultant closed condition of the energizing circuits for its operating and locking windings, means for supplying energizing current to the operating windings of said first and second relays to operate these relays thereby opening their back contacts and closing their front contacts, the resultant operation of said third relay and disabling of said fourth relay due to the energization and de-energization of their respective operating and locking windings causing the opening of the back contacts of said third relay and the closing of the back contacts of said fourth relay, respectively, one controlled circuit operatively responsive to the opening of the back contacts of said third relay and a second controlled circuit operatively responsive to the closing of the back contacts of said fourth relay.

THEODORE A. JONES.

References Cited in the file of this patent

UNITED STATES PATENTS

| Number | Name | Date |
|---|---|---|
| 1,031,096 | Steen | July 2, 1912 |
| 1,845,227 | Bower | Feb. 16, 1932 |
| 2,087,352 | Mitchell et al. | July 20, 1937 |
| 2,096,450 | Curtis | Oct. 19, 1937 |
| 2,102,138 | Strieby | Dec. 14, 1937 |
| 2,132,180 | Mitchell | Oct. 4, 1938 |
| 2,152,709 | Schett | Apr. 4, 1939 |
| 2,181,539 | Wertz | Nov. 28, 1939 |
| 2,206,080 | Davis | July 2, 1940 |
| 2,236,276 | Stewart | Mar. 25, 1941 |
| 2,295,894 | Dewan | Sept. 15, 1942 |
| 2,299,937 | Sprague | Oct. 27, 1942 |
| 2,347,015 | Woloschak | Apr. 18, 1944 |
| 2,375,229 | Klemperer | May 8, 1945 |
| 2,512,879 | Roggenstein | June 27, 1950 |
| 2,525,016 | Borell | Oct. 10, 1950 |